(12) United States Patent
Hosono

(10) Patent No.: US 8,441,980 B2
(45) Date of Patent: May 14, 2013

(54) MOBILE COMMUNICATION METHOD, NETWORK DEVICE AND RADIO BASE STATION

(75) Inventor: Hiroyuki Hosono, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 198 days.

(21) Appl. No.: 13/055,265

(22) PCT Filed: Jul. 22, 2009

(86) PCT No.: PCT/JP2009/063104
§ 371 (c)(1),
(2), (4) Date: Apr. 26, 2011

(87) PCT Pub. No.: WO2010/010895
PCT Pub. Date: Jan. 28, 2010

(65) Prior Publication Data
US 2011/0190002 A1    Aug. 4, 2011

(30) Foreign Application Priority Data

Jul. 22, 2008    (JP) ................... 2008-189031

(51) Int. Cl.
*H04B 7/212* (2006.01)
(52) U.S. Cl.
USPC ........................... 370/322; 370/348
(58) Field of Classification Search ............ 370/322, 370/329, 341, 348, 349
See application file for complete search history.

(56) References Cited

U.S. PATENT DOCUMENTS

| | | | |
|---|---|---|---|
| 6,570,873 B1 | 5/2003 | Isoyama et al. | |
| 7,295,514 B2 * | 11/2007 | Cha et al. | 370/230 |
| 2003/0148774 A1 | 8/2003 | Naghian et al. | |
| 2005/0075110 A1 * | 4/2005 | Posti et al. | 455/452.1 |
| 2007/0054668 A1 | 3/2007 | Scheinert et al. | |
| 2007/0097938 A1 | 5/2007 | Nylander et al. | |
| 2009/0270107 A1 * | 10/2009 | Lee et al. | 455/450 |
| 2010/0278141 A1 * | 11/2010 | Choi-Grogan et al. | 370/331 |

FOREIGN PATENT DOCUMENTS

| | | |
|---|---|---|
| JP | 2000-151703 A | 5/2000 |
| JP | 2003 520519 | 7/2003 |
| JP | 2006 166081 | 6/2006 |
| JP | 2007 534227 | 11/2007 |
| WO | 2007 040449 | 4/2007 |

OTHER PUBLICATIONS

Japanese Office Action issued Jul. 17, 2012 in Patent Application No. 2010-521716 with English Translation.
Office Action issued Apr. 10, 2012 in Japanese Application No. 2010-521716 (With English Translation).
"Requirements for LTE Home eNodeBs", 3GPP TSG RAN #35, Orange, Telecom Italia, T-Mobile, Vodafone, Total Pages 4, (Mar. 6-9, 2007).
International Search Report Issued Sep. 29, 2009 in PCT/JP09/063104 filed Jul. 22, 2009.

* cited by examiner

*Primary Examiner* — Brenda H Pham
(74) *Attorney, Agent, or Firm* — Oblon, Spivak, McClelland, Maier & Neustadt, L.L.P.

(57) ABSTRACT

A mobile communication method according to the present invention includes: step of establishing, upon receipt of a control channel establishment request for connection-type communication from a priority mobile station 300 in a femto-cell radio base station 201, a control channel for the priority mobile station by using a first reserved resource reserved for the priority mobile station 300 in the femto-cell radio base station 201; step of establishing a data channel for the priority mobile station 300; step of establishing a control channel for the non-priority mobile station 350 by using a non-reserved resource that is not reserved for any mobile station in the femto-cell radio base station 201; and step of establishing a data channel for the non-priority mobile station 350.

9 Claims, 9 Drawing Sheets

FEMTO-CELL RADIO BASE STATION 201

| MOBILE STATION ID | RESERVED RESOURCE |
|---|---|
| 300 | A |
| 310 | B |
| 320 | C |

MOBILE COMMUNICATION METHOD, NETWORK DEVICE AND RADIO BASE STATION

TECHNICAL FIELD

The present invention relates to a mobile communication method, a network device and a radio base station.

BACKGROUND ART

In a mobile communication system, generally, in order for a macro-cell radio base station providing a public communication service to fairly respond to randomly occurring connection requests from mobile stations, when resources used by a macro-cell radio base station accommodating a certain mobile station exceed a certain value at the point of reception of a connection request from the mobile station, call proceeding processing, in which the connection request is rejected and the mobile station is instructed to transmit a connection request to another macro-cell radio base station, is executed.

The mobile communication system maintains the fairness, by such call proceeding processing, based on the logic that the mobile station to send a connection request firstly to a macro-cell radio base station can use resources of the macro-cell radio base station.

SUMMARY OF THE INVENTION

Problem to be Solved by the Invention

There has recently been studied a method for operating a radio base station installed in a small area such as a home, called a femto-cell radio base station (Home eNB).

By using such a femto-cell radio base station, a mobile station of an owner of the femto-cell radio base station or a mobile station of a user specified by the owner may receive preferential treatment such as discounts on communication fees when the mobile station performs communication via the femto-cell radio base station.

Even in such a situation, if the femto-cell radio base station performs the call proceeding processing according to the macro-cell radio base station described above, thereby giving priority to a connection request from a mobile station of a general user and rejecting a connection request from the mobile station of the owner of the femto-cell radio base station or the mobile station of the user specified by the owner, there arises a problem of improper obstruction on preferential treatment to be given to the owner of the femto-cell radio base station or the user specified by the owner.

Therefore, it is an objective of the present invention to provide a mobile communication method, a network device and a radio base station, which allow a femto-cell radio base station to perform appropriate call proceeding processing giving preferential treatment to an owner of the femto-cell radio base station or a user specified by the owner.

Means for Solving the Problem

The first feature of the present invention is summarized in that a mobile communication method comprising: step A of establishing, upon receipt of a control channel establishment request for connection-type communication from a priority mobile station in a femto-cell radio base station, a control channel for the priority mobile station by using a first reserved resource reserved for the priority mobile station in the femto-cell radio base station; step B of establishing a data channel for the priority mobile station in the femto-cell radio base station in response to a data channel establishment request for connection-type communication transmitted from the priority mobile station through the established control channel for the priority mobile station; step C of establishing, upon receipt of a control channel establishment request for connection-type communication from a non-priority mobile station in the femto-cell radio base station, a control channel for the non-priority mobile station by using a non-reserved resource that is not reserved for any mobile station in the femto-cell radio base station; and step D of establishing a data channel for the non-priority mobile station in the femto-cell radio base station in response to a data channel establishment request for connection-type communication transmitted from the non-priority mobile station through the established control channel for the non-priority mobile station.

The second feature of the present invention is summarized in that a network device comprising: a control channel establishment unit configured to give an instruction, upon receipt of a control channel establishment request for connection-type communication from a priority mobile station in a femto-cell radio base station, to establish a control channel for the priority mobile station by using a first reserved resource reserved for the priority mobile station in the femto-cell radio base station, and to give an instruction, upon receipt of a control channel establishment request for connection-type communication from a non-priority mobile station in the femto-cell radio base station, to establish a control channel for the non-priority mobile station by using a non-reserved resource that is not reserved for any mobile station in the femto-cell radio base station; and data channel establishment unit configured to give an instruction to establish a data channel for the priority mobile station in the femto-cell radio base station, in response to a data channel establishment request for connection-type communication transmitted from the priority mobile station through the established control channel for the priority mobile station, and to give an instruction to establish a data channel for the non-priority mobile station in the femto-cell radio base station, in response to a data channel establishment request for connection-type communication transmitted from the non-priority mobile station through the established control channel for the non-priority mobile station.

The third feature of the present invention is summarized in that a radio base station comprising: a control channel establishment unit configured to establish, upon receipt of a control channel establishment request for connection-type communication from a priority mobile station, a control channel for the priority mobile station by using a first reserved resource reserved for the priority mobile station, and to establish, upon receipt of a control channel establishment request for connection-type communication from a non-priority mobile station, a control channel for the non-priority mobile station by using a non-reserved resource that is not reserved for any mobile station; and a data channel establishment unit configured to establish a data channel for the priority mobile station in response to a data channel establishment request for connection-type communication transmitted from the priority mobile station through the established control channel for the priority mobile station, and to establish a data channel for the non-priority mobile station in response to a data channel establishment request for connection-type communication transmitted from the non-priority mobile station through the established control channel for the non-priority mobile station.

Effects of the Invention

As described above, the present invention can provide a mobile communication method, a network device and a radio base station, which allow a femto-cell radio base station to perform appropriate call proceeding processing giving preferential treatment to an owner of the femto-cell radio base station or a user specified by the owner.

MODES FOR CARRYING OUT THE INVENTION

Configuration of Mobile Communication System According to the First Embodiment of the Present Invention With reference to FIGS. 1 through 4, description is given of a configuration of a mobile communication system according to a first embodiment of the present invention.

Figure 1:
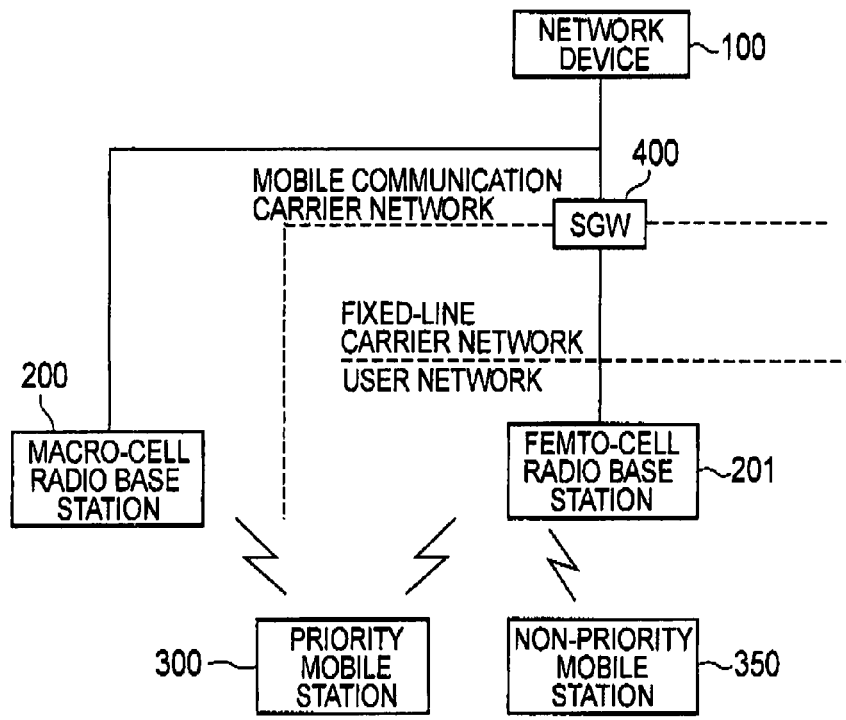
FIG. 1 is an overall configuration diagram of a mobile communication system according to a first embodiment of the present invention.

As shown in FIG. 1, the mobile communication system according to this embodiment is a W-CDMA mobile communication system, and includes a network device 100, a gateway device (SGW: Security Gateway) 400, a macro-cell radio base station 200 and a femto-cell radio base station 201.

The macro-cell radio base station 200 and the femto-cell radio base station 201 are accommodated in the network device 100.

The gateway device 400 is located on a boundary of a mobile communication carrier network (LAN: Local Area Network managed by a mobile communication carrier).

The gateway device 400 is for protecting the mobile communication carrier network from unauthorized access from another network. The gateway device 400 allows access to the mobile communication carrier network only when the access is recognized proper by authentication processing by the gateway device 400.

The macro-cell radio base station 200 is a first radio base station provided in the mobile communication carrier network, while the femto-cell radio base station 201 is a second radio base station provided in a user network outside the mobile communication carrier network (i.e., a network managed by a user who is a subscriber of the carrier).

For example, the femto-cell radio base station 201 is located in a LAN managed by the user described above, and is connected to the network device 100 located on the mobile communication carrier network through an access-line provider network (fixed-line carrier network) such as FTTH (Fiber To The Home) or ADSL (Asymmetric Digital Subscriber Line).

In this embodiment, the network device 100 is a radio control device configured to allocate to the macro-cell radio base station 200 and the femto-cell radio base station 201 radio resources (frequency, code or time slot), wired resources (wired band) and the like for communicating with a mobile station 300 and the like.

Figure 2:
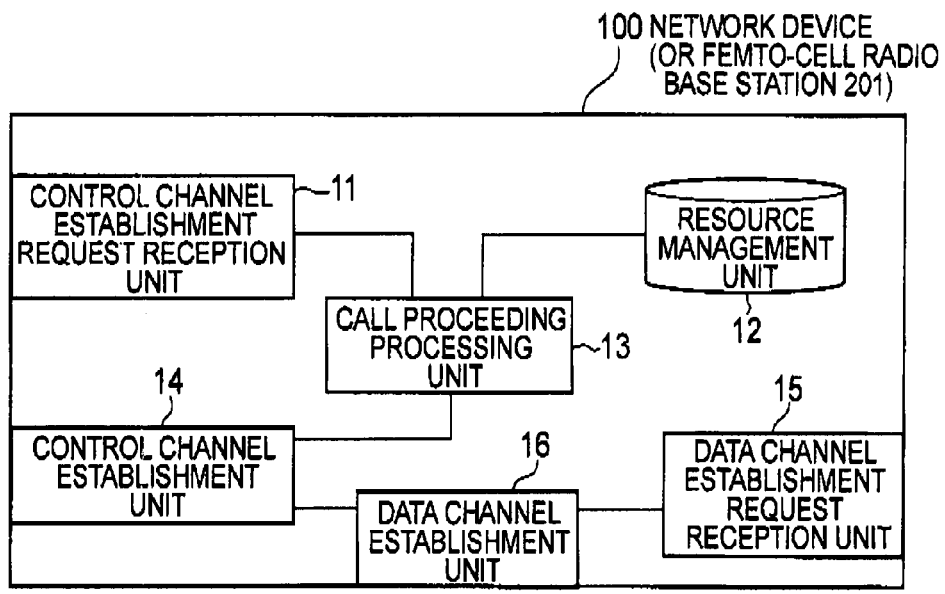
FIG. 2 is a functional block diagram of a network device or a femto-cell radio base station according to the first embodiment of the present invention.

As shown in FIG. 2, the network device 100 includes a control channel establishment request reception unit 11, a resource management unit 12, a call proceeding processing unit 13, a control channel establishment unit 14, a data channel establishment request reception unit 15 and a data channel establishment unit 16.

The control channel establishment request reception unit 11 is configured to receive a control channel establishment request. For example, the control channel establishment request reception unit 11 is configured to receive a control channel establishment request transmitted from each of priority mobile stations 300, 310 and 320 or from a non-priority mobile station 350 in the femto-cell radio base station 201.

Here, each of the priority mobile stations 300 to 320 is a mobile station registered as a mobile station of an owner of the femto-cell radio base station 201 or as a mobile station of a user specified by the owner. Meanwhile, the non-priority mobile station is a mobile station that is not registered as the mobile station of the owner of the femto-cell radio base station 201 or as the mobile station of the user specified by the owner.

The control channel establishment request is a signal for requesting the mobile station that is the source of the control channel establishment request to establish a dedicated control channel with a certain radio base station (e.g., the macro-cell radio base station or the femto-cell radio base station).

The control channel establishment request includes, for example, a control channel establishment request for connection-type communication and a control channel establishment request for connectionless-type communication. Here, examples of the connection-type communication include voice communication and the like, while examples of the connectionless-type communication include packet communication and the like.

Figures 3, 4:
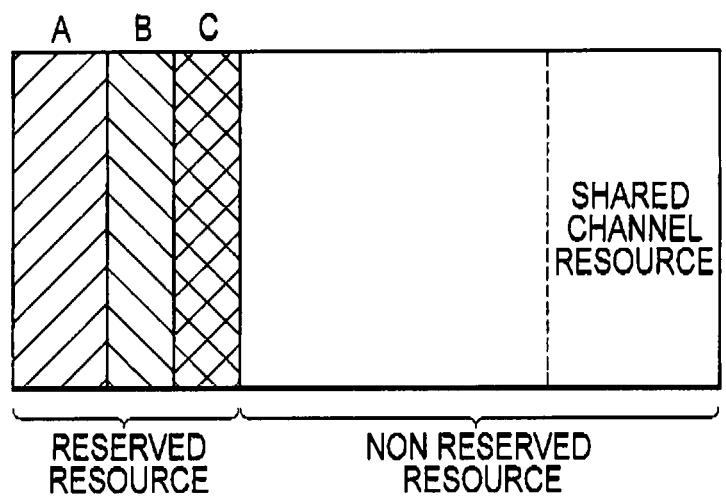
FIG. 3 is a table showing an example of resources reserved for each mobile station by the network device according to the first embodiment of the present invention.
FIG. 4 is a table showing an example of resources reserved for each mobile station by the network device according to the first embodiment of the present invention.

The resource management unit 12 is configured to allocate reserved resources A to C to the priority mobile stations 300 to 320, respectively, for each femto-cell radio base station (e.g., the femto-cell radio base station 201), as shown in FIG. 3.

Here, the reserved resources mean radio resources (frequency, code or time slot), wired resources (wired band of a backhaul line of the femto-cell radio base station), hardware resources (CPU occupancy of the femto-cell radio base station) or the like for performing communication between each femto-cell radio base station and each mobile station.

As shown in FIG. 4, the resource management unit 12 may be configured to allocate the reserved resources A to C to the different priority mobile stations 300 to 320, respectively. Specifically, as shown in FIG. 4, the amount of reserved resources (e.g., frequency band or the like) for each of the priority mobile stations 300 to 320 may vary among the priority mobile stations.

Note that the resource management unit 12 may manage shared channel resources within non-reserved resources which are not reserved for any mobile station. Here, the shared channel resources are used for establishing a control channel and a data channel for connectionless-type communication.

Here, the owner of the femto-cell radio base station 201 can register any of the priority mobile stations in the femto-cell radio base station 201, a reserved resource for the priority mobile station, or the like in the resource management unit 12 by accessing a predetermined web page using the mobile station 300.

The call proceeding processing unit 13 is configured to perform acceptance determination processing for the control channel establishment request described above based on resource usage such as radio resource usage, wired resource usage or hardware resource utilization in the radio base stations 200 and 201.

To be more specific, the call proceeding processing unit 13 is configured to, upon receipt of a control channel establishment request for connection-type communication from the priority mobile station 300 in the femto-cell radio base station 201, determine whether or not to accept the control channel establishment request based on whether or not there is any reserved resource A for the priority mobile station 300 or non-reserved resource available in the femto-cell radio base station 201.

More specifically, the call proceeding processing unit 13 is configured to accept the control channel establishment request for connection-type communication when there is the reserved resource A or non-reserved resource available in the femto-cell radio base station 201, and not to accept the control channel establishment request for connection-type communication when there is no reserved resource A or non-reserved resource available in the femto-cell radio base station 201.

The call proceeding processing unit 13 is further configured to, upon receipt of a control channel establishment request for connection-type communication from the non-priority mobile station 350 in the femto-cell radio base station 201, determine whether or not to accept the control channel establishment request based on whether or not there is any non-reserved resource available.

More specifically, the call proceeding processing unit 13 is configured to accept the control channel establishment request for connection-type communication when there is non-reserved resource available in the femto-cell radio base station 201, and not to accept the control channel establishment request for connection-type communication when there is no non-reserved resource available in the femto-cell radio base station 201.

The call proceeding processing unit 13 is further configured to, upon receipt of control channel establishment requests for connectionless-type communication from the priority mobile stations 300 to 320 and the non-priority mobile station 350 in the femto-cell radio base station 201, determine whether or not to accept the control channel establishment requests based on whether or not there is any shared channel resource available.

More specifically, the call proceeding processing unit 13 is configured to accept the control channel establishment request for connectionless-type communication when there is shared channel resource available in the femto-cell radio base station 201, and not to accept the control channel establishment request for connectionless-type communication when there is no shared channel resource available in the femto-cell radio base station 201.

When the control channel establishment request is accepted by the reception processing unit 13, the control channel establishment unit 14 gives an instruction to establish a control channel between the mobile station and the radio base station related to the control channel establishment request.

To be more specific, when the call proceeding processing unit 13 accepts the control channel establishment request for connection-type communication from the priority mobile station 300 in the femto-cell radio base station 201, the control channel establishment unit 14 gives an instruction to establish a control channel for the priority mobile station 300 by transmitting a control channel acquisition request or a control channel instruction to the femto-cell radio base station 201 or the priority mobile station 300 and by using the reserved resource A (first reserved resource) for the priority mobile station 300 in the femto-cell radio base station 201.

Meanwhile, when the call proceeding processing unit 13 accepts the control channel establishment request for connection-type communication from the non-priority mobile station 350 in the femto-cell radio base station 201, the control channel establishment unit 14 gives an instruction to establish a control channel for the non-priority mobile station 350 by transmitting a control channel acquisition request or a control channel instruction to the femto-cell radio base station 201 or the non-priority mobile station 350 and by using the non-reserved resource in the femto-cell radio base station 201.

Further, when the call proceeding processing unit 13 accepts the control channel establishment request for connectionless-type communication from the priority mobile station 300 and the non-priority mobile station 350 in the femto-cell radio base station 201, the control channel establishment unit 14 gives an instruction to establish a control channel for connectionless-type communication by transmitting a control channel acquisition request or a control channel instruction to the femto-cell radio base station 201 or the mobile stations 300, 350 and by using the shared channel resource in the femto-cell radio base station 201.

The data channel establishment request reception unit 15 is configured to receive a data channel establishment request. For example, the data channel establishment request reception unit 15 is configured to receive a data channel establishment request transmitted from each of the priority mobile stations 300 to 320 or the non-priority mobile station 350 in the femto-cell radio base station 201 through the established control channel.

The data channel establishment unit 16 gives an instruction to establish a data channel for the priority mobile station 300 (for connection-type communication and for connectionless-type communication), in response to the data channel establishment request transmitted from the priority mobile station 300 through the control channel for the priority mobile station 300.

In addition, the data channel establishment unit 16 gives an instruction to establish a data channel for the non-priority mobile station 350 (for connection-type communication and for connectionless-type communication), in response to the data channel establishment request transmitted from the non-priority mobile station 350 through the control channel for the non-priority mobile station 350.

Note that the data channel establishment unit 16 is configured not to establish a data channel for the priority mobile station 300 or a data channel for the non-priority mobile station 350 when there is no resource for data channel available even if a control channel for the priority mobile station 300 or a control channel for the non-priority mobile station 350 is established.

Here, the data channel establishment unit 16 may use a resource in the reserved resources described above or may use a resource in the non-reserved resources described above (e.g., the shared channel resources) as the resource for data channel in establishing the data channel for the priority mobile station 300.

The data channel establishment unit 16 uses a resource in the non-reserved resources described above (e.g., the shared channel resources) as the resource for data channel in establishing the data channel for the non-priority mobile station 350.

Figure 5:
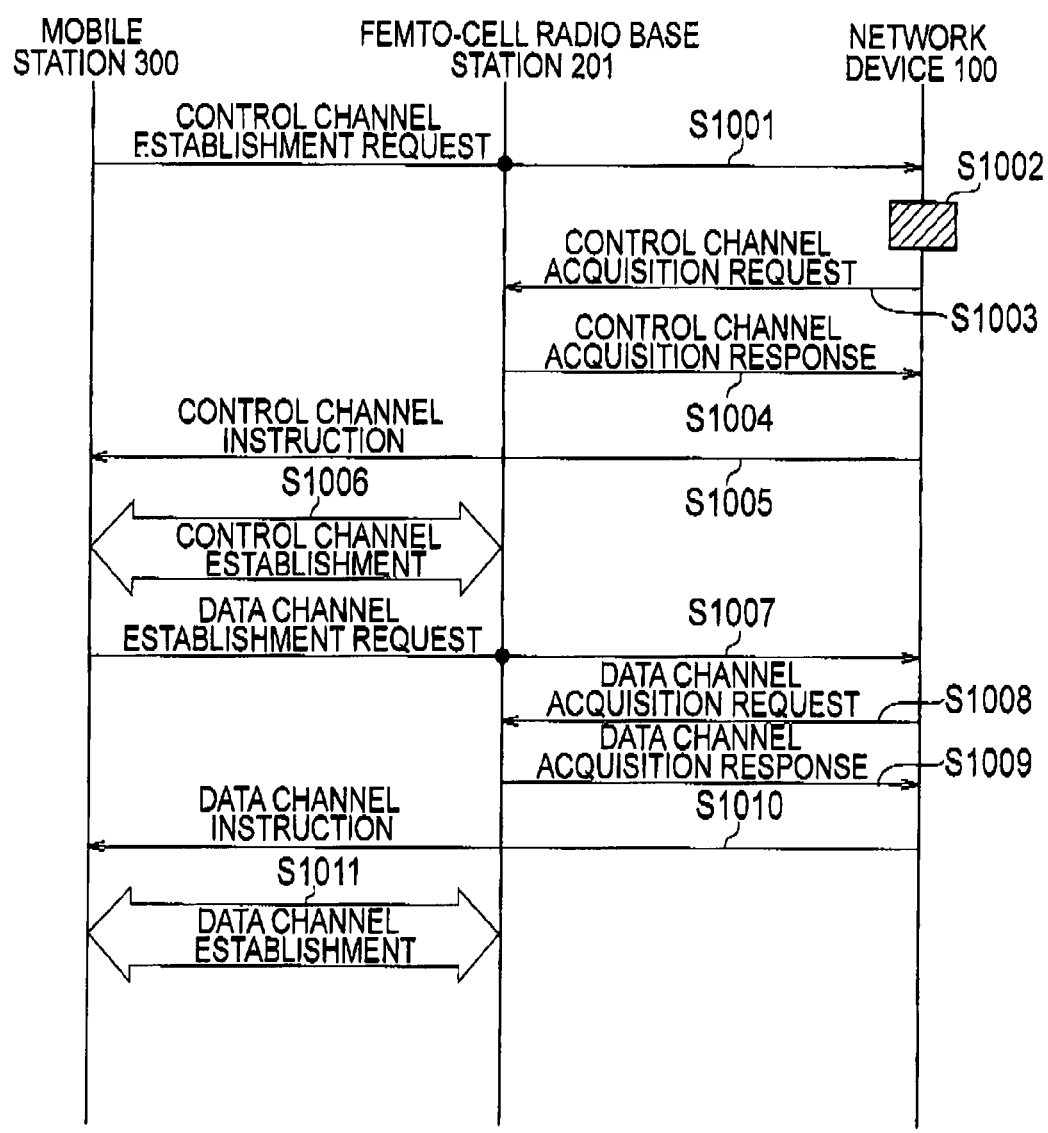
FIG. 5 is a sequence diagram showing operations of the mobile communication system according to the first embodiment of the present invention.
Figure 6:
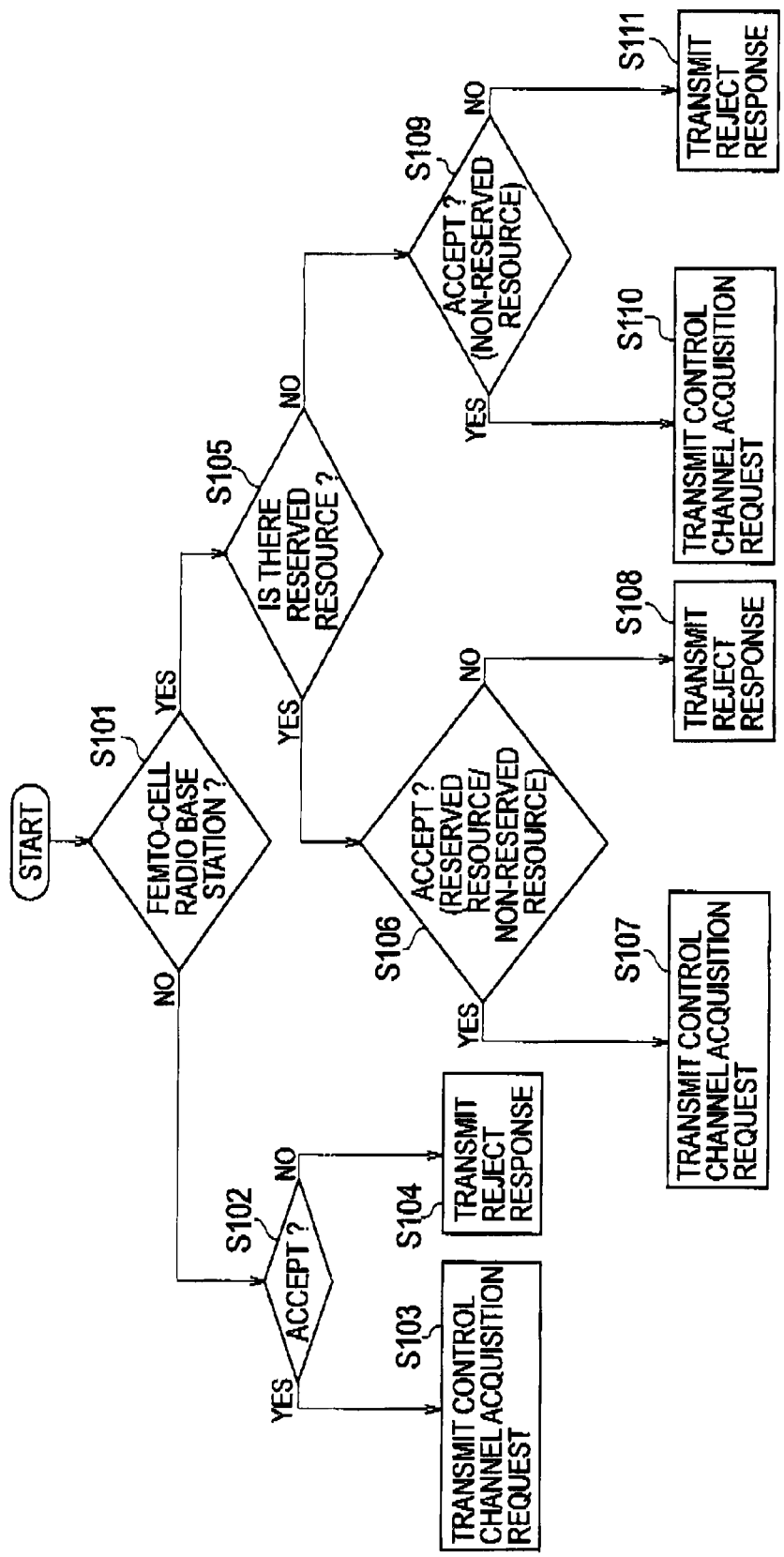
FIG. 6 is a flowchart showing operations of the network device according to the first embodiment of the present invention.

Operations of Mobile Communication System According to the First Embodiment of the Present Invention With reference to FIGS. 5 and 6, description is given of operations of the mobile communication system according to the first embodiment of the present invention.

As shown in FIG. 5, in Step S1001, the mobile station 300 transmits a control channel establishment request for connection-type communication to the network device (e.g., radio control device) 100 through the femto-cell radio base station 201.

In Step S1002, the network device 100 determines whether or not to accept the control channel establishment request for connection-type communication.

When determining to accept the control channel establishment request for connection-type communication, the network device 100 transmits, in Step S1003, to the femto-cell radio base station 201 a control channel acquisition request for requesting a control channel resource to be acquired for the mobile station 300.

In Step S1004, the femto-cell radio base station 201 acquires the control channel resource for the mobile station 300, and transmits to the network device 100 a control channel acquisition response for notifying of that effect.

In Step S1005, the network device 100 transmits to the mobile station 300 a control channel instruction for instructing the control channel acquired for the mobile station 300.

In Step S1006, a control channel is established between the femto-cell radio base station 201 and the mobile station 300.

In Step S1007, the mobile station 300 transmits a data channel establishment request for connection-type communication to the network device 100 through the control channel established between the mobile station 300 and the femto-cell radio base station 201.

In Step S1008, the network device 100 transmits to the femto-cell radio base station 201 a data channel acquisition request for requesting a data channel resource to be acquired for the mobile station 300.

In Step S1009, the femto-cell radio base station 201 acquires the data channel resource for the mobile station 300, and transmits to the network device 100 a data channel acquisition response for notifying to that effect.

In Step S1010, the network device 100 transmits to the mobile station 300 a data channel instruction for instructing specific information on the data channel acquired for the mobile station 300.

In Step S1011, a data channel is established between the femto-cell radio base station 201 and the mobile station 300.

Here, with reference to FIG. 6, description is given of the operation of the network device 100 in Step S1002 for determining whether or not to accept the control channel establishment request for connection-type communication.

In Step S101, the network device 101 determines whether or not the control channel establishment request is one received via the femto-cell radio base station 201.

When determining in Step S101 that the control channel establishment request is not the one received via the femto-cell radio base station 201, the network device 100 determines in Step S102 whether or not to accept the control channel establishment request based on whether or not there is any non-reserved resource available in the femto-cell radio base station 201.

When determining to accept the control channel establishment request, the network device 100 transmits the control channel acquisition request described above to the femto-cell radio base station 201 in Step S103.

Meanwhile, when determining not to accept the control channel establishment request, the network device 100 transmits to the femto-cell radio base station 201 a reject response for notifying to that effect in Step S104.

When determining in Step S101 that the control channel establishment request is one received via the femto-cell radio base station 201, the network device 100 determines in Step S105 whether or not a reserved resource is reserved for the mobile station 300 that is the source of the control channel establishment request, in the femto-cell radio base station 201.

When determining in Step S105 that a reserved resource is reserved for the mobile station 300, the network device 100 determines in Step S106 whether or not to accept the control channel establishment request based on whether or not there is any reserved resource for the mobile station 300 or non-reserved resource available in the femto-cell radio base station 201.

When determining in Step S106 to accept the control channel establishment request, the network device 100 transmits the control channel acquisition request described above to the femto-cell radio base station 201 in Step S107.

Meanwhile, when determining in Step S106 not to accept the control channel establishment request, the network device 100 transmits to the femto-cell radio base station 201 a reject response for notifying to that effect in Step S108.

When determining in Step S105 that a reserved resource is not reserved for the mobile station 300, the network device 100 determines in Step 3109 whether or not to accept the control channel establishment request based on whether or not there is any non-reserved resource available in the femto-cell radio base station 201.

When determining in Step S109 to accept the control channel establishment request, the network device 100 transmits the control channel acquisition request described above to the femto-cell radio base station 201 in Step S110.

Meanwhile, when determining in Step S109 not to accept the control channel establishment request, the network device 100 transmits to the femto-cell radio base station 201 a reject response for notifying to that effect in Step S111.

Advantageous Effects of Mobile Communication System According to the First Embodiment of the Present Invention The mobile communication system according to the first embodiment of the present invention allows the femto-cell radio base station 201 to perform appropriate call proceeding processing giving preferential treatment to an owner of the femto-cell radio base station or a user specified by the owner.

The mobile communication system according to the first embodiment of the present invention allows the amount of resources A to C reserved for the priority mobile stations 300 to 320 in each femto-cell radio base station 201 to be flexibly changed according to the intention of the owner of each femto-cell radio base station.

Furthermore, the mobile communication system according to the first embodiment of the present invention can increase resources that can be used by the non-priority mobile station while giving priority to the connection-type communication by the priority mobile station, since a resource required to establish a control channel for connection-type communication is reserved for the priority mobile station but a resource required to establish a control channel for connectionless-type communication is not reserved.

Figure 11:
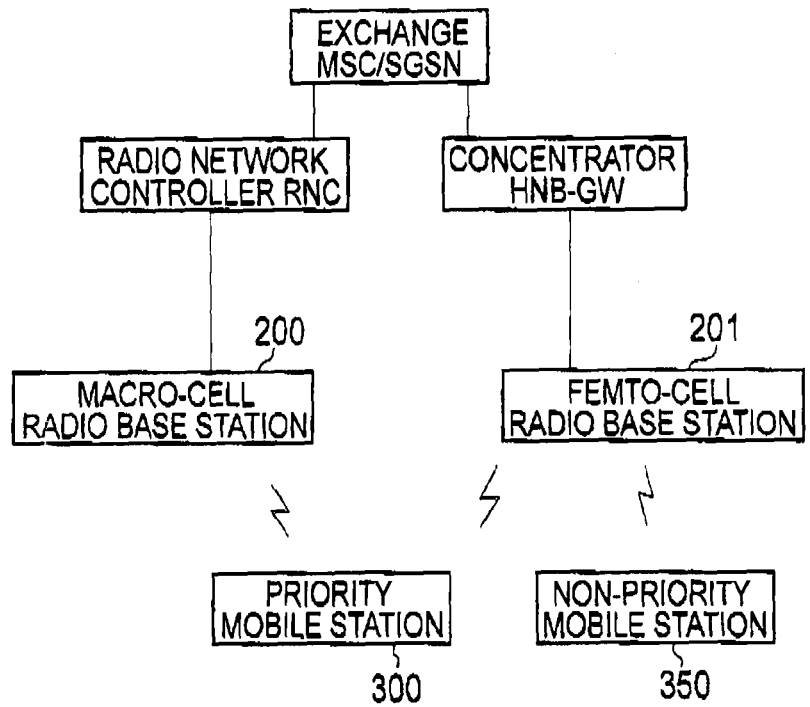
FIG. 11 is a diagram showing a specific configuration of the mobile communication system according to the first embodiment of the present invention.

Note that FIG. 11 shows an example of a specific configuration of the mobile communication system according to the first embodiment of the present invention. In the example shown in FIG. 11, an exchange MSC/SGSN, a radio network controller RNC and a concentrator HNB-GW make up the network device 100 described above.

Here, the femto-cell radio base station 201 may be accommodated in the radio network controller RNC instead of the concentrator HNB-GW.

In other words, a part of or the entire configuration of the network device 100 shown in FIG. 2 is provided in any of the exchange MSC/SGSN, the radio network controller RNC and the concentrator HNB-GW.

Modified Example 1

Figure 7:
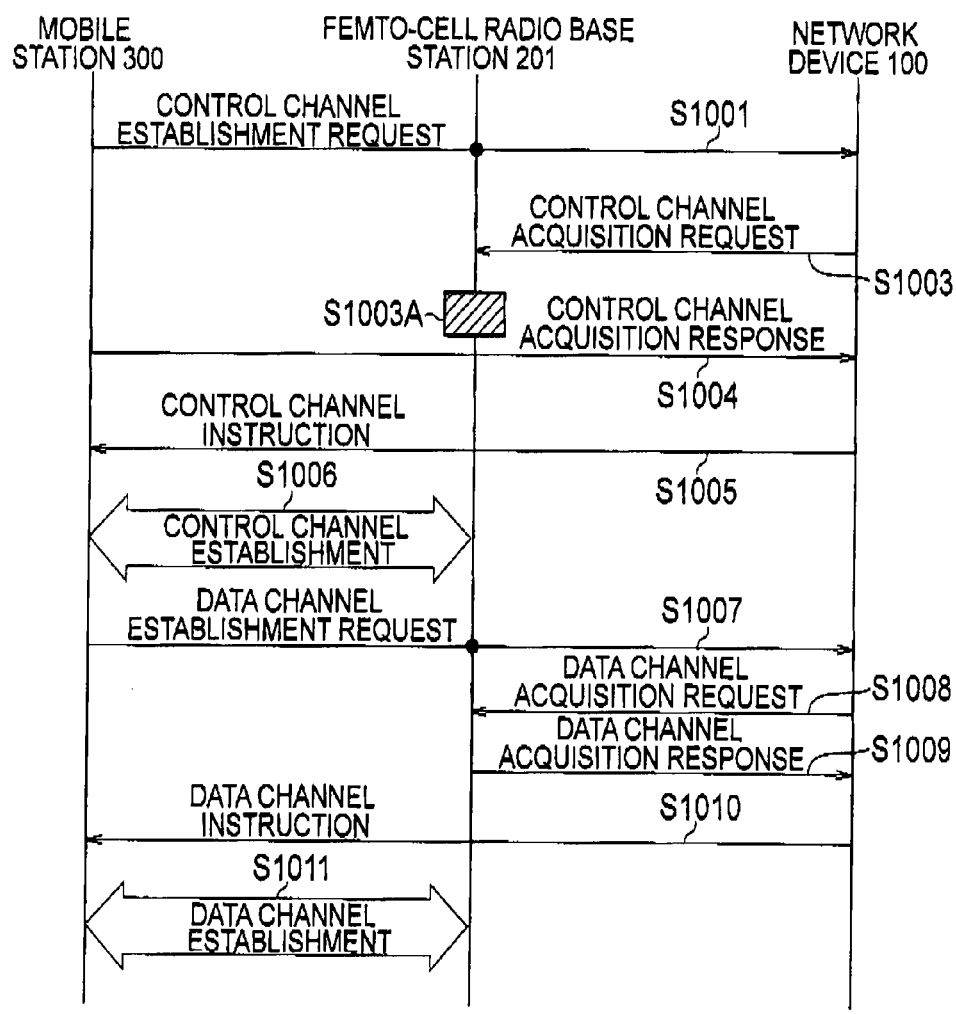
FIG. 7 is a sequence diagram showing operations of a mobile communication system according to Modified Example 1 of the present invention.
Figure 8:
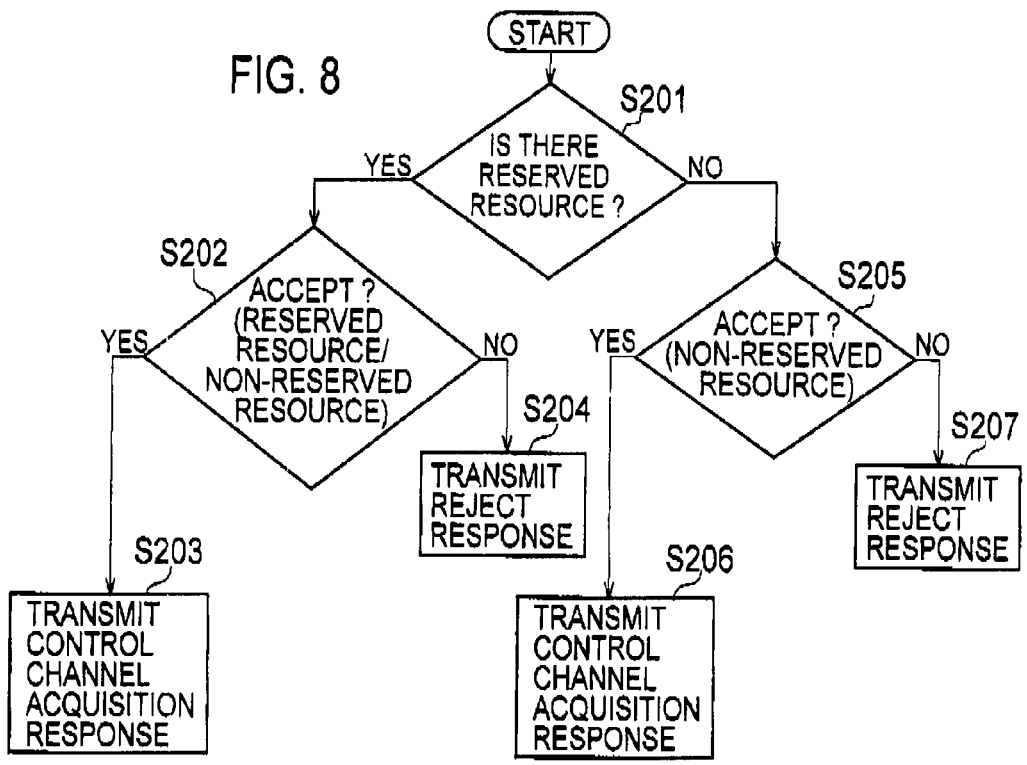
FIG. 8 is a flowchart showing operations of a network device according to Modified Example 1 of the present invention.

With reference to FIGS. 7 and 8, description is given below of a mobile communication system according to Modified Example 1 of the present invention by focusing on differences from the mobile communication system according to the first embodiment described above.

In the mobile communication system according to the first embodiment described above, the network device 100 is configured to perform acceptance determination processing for the control channel establishment request described above. Meanwhile, in the mobile communication system according to Modified Example 1, a femto-cell radio base station 201 is configured to perform acceptance determination processing for the control channel establishment request described above.

With reference to FIGS. 7 and 8, description is given of operations of the mobile communication system according to Modified Example 1 of the present invention.

As shown in FIG. 7, in Step S1001, the mobile station 300 transmits a control channel establishment request for connection-type communication to the network device (e.g., radio control device) 100 through the femto-cell radio base station 201.

In Step S1003, the network device 100 transmits to the femto-cell radio base station 201 a control channel acquisition request for requesting a control channel resource to be acquired for the mobile station 300.

In Step S1003A, the femto-cell radio base station 201 determines whether or not to accept the control channel establishment request for connection-type communication described above in response to the received control channel acquisition request.

When determining to accept the control channel establishment request for connection-type communication, in Step S1004, the femto-cell radio base station 201 acquires the control channel resource for the mobile station 300, and transmits to the network device 100 a control channel acquisition response for notifying to that effect.

Operations from Step S1005 to Step 31011 are the same as those from Step S1005 to Step S1011 shown in FIG. 5.

Here, with reference to FIG. 8, description is given of the operation of the femto-cell radio base station 201 in Step S1003A for determining whether or not to accept the control channel establishment request for connection-type communication.

In Step S201, the femto-cell radio base station 201 determines whether or not a reserved resource is reserved for the mobile station 300 that is the source of the control channel establishment request described above, in response to the control channel acquisition request received from the network device 100.

When determining in Step S201 that a reserved resource is reserved for the mobile station 300, the femto-cell radio base station 201 determines in Step S202 whether or not to accept the control channel establishment request based on whether or not there is any reserved resource for the mobile station 300 or any non-reserved resource available.

When determining in Step S202 to accept the control channel establishment request, the femto-cell radio base station 201 transmits the control channel acquisition response described above to the network device 100 in Step S203.

Meanwhile, when determining in Step S202 not to accept the control channel establishment request, the femto-cell radio base station 201 transmits to the network device 100 a reject response for notifying to that effect in Step S203.

When determining in Step S201 that a reserved resource is not reserved for the mobile station 300, the femto-cell radio base station 201 determines in Step S205 whether or not to accept the control channel establishment request based on whether or not there is any non-reserved resource available.

When determining in Step S205 to accept the control channel establishment request, the femto-cell radio base station 201 transmits the control channel acquisition request described above to the network device 100 in Step S206.

Meanwhile, when determining in Step S205 not to accept the control channel establishment request, the femto-cell radio base station 201 transmits to the network device 100 a reject response for notifying to that effect in Step S207.

Figure 12:
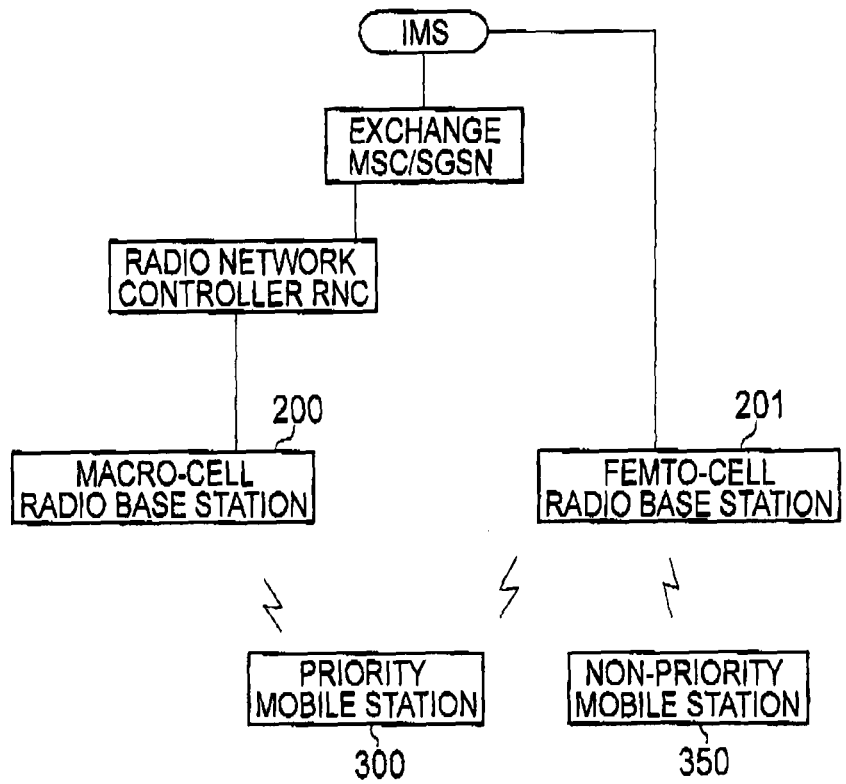
FIG. 12 is a diagram showing a specific configuration of the mobile communication system according to Modified Example 1 of the present invention.

Note that FIG. 12 shows an example of a specific configuration of a mobile communication system according to Modified Example 1 (in the case of a WCDMA mobile communication system). In the example shown in FIG. 12, the femto-cell radio base station 201 is configured to be accommodated directly in an IMS (IP Multimedia Subsystem) without any exchange MSC/SGSN interposed therebetween.

Figure 13:
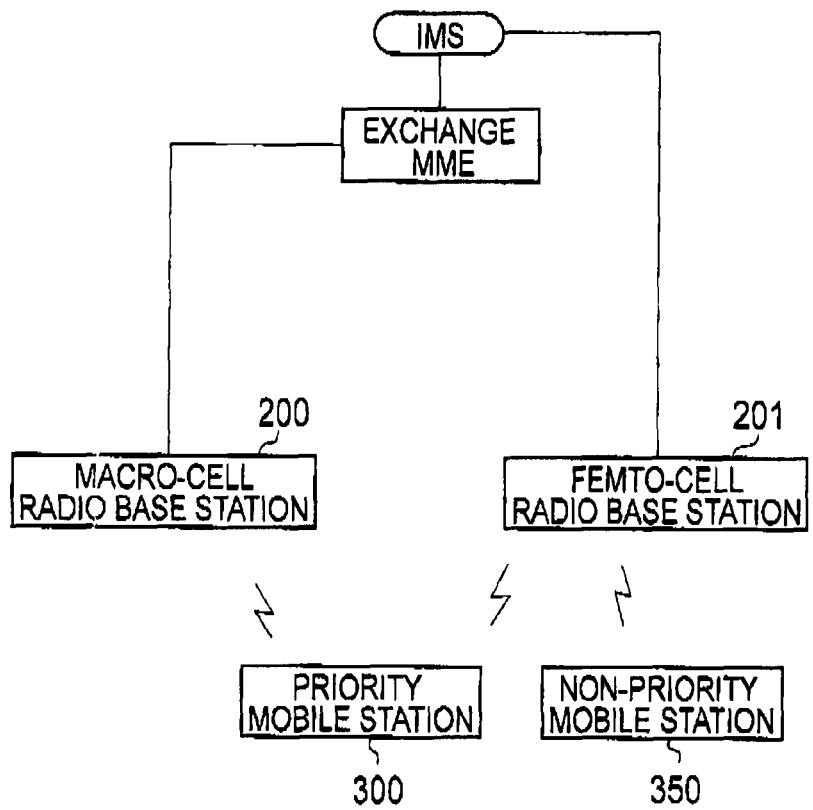
FIG. 13 is a diagram showing a specific configuration of the mobile communication system according to Modified Example 1 of the present invention.

Furthermore, FIG. 13 shows an example of a specific configuration of a mobile communication system according to Modified Example 1 (in the case of an LTE mobile communication system). In the example shown in FIG. 13, the femto-cell radio base station 201 is configured to be accommodated directly in an IMS (IP Multimedia Subsystem) without any exchange MME interposed therebetween.

Modified Example 2

Figure 9:
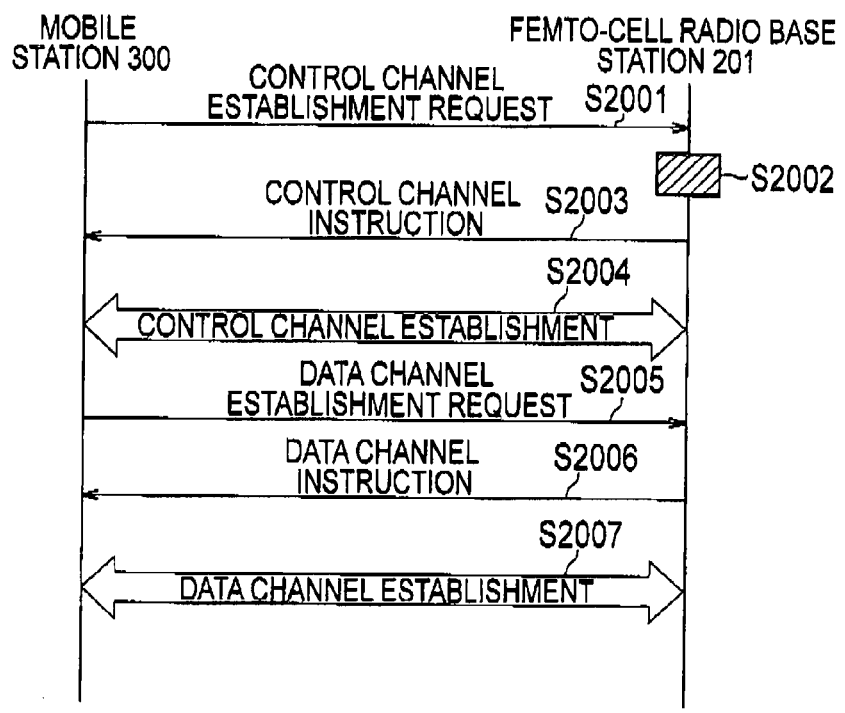
FIG. 9 is a sequence diagram showing operations of a mobile communication system according to Modified Example 2 of the present invention.
Figure 10:
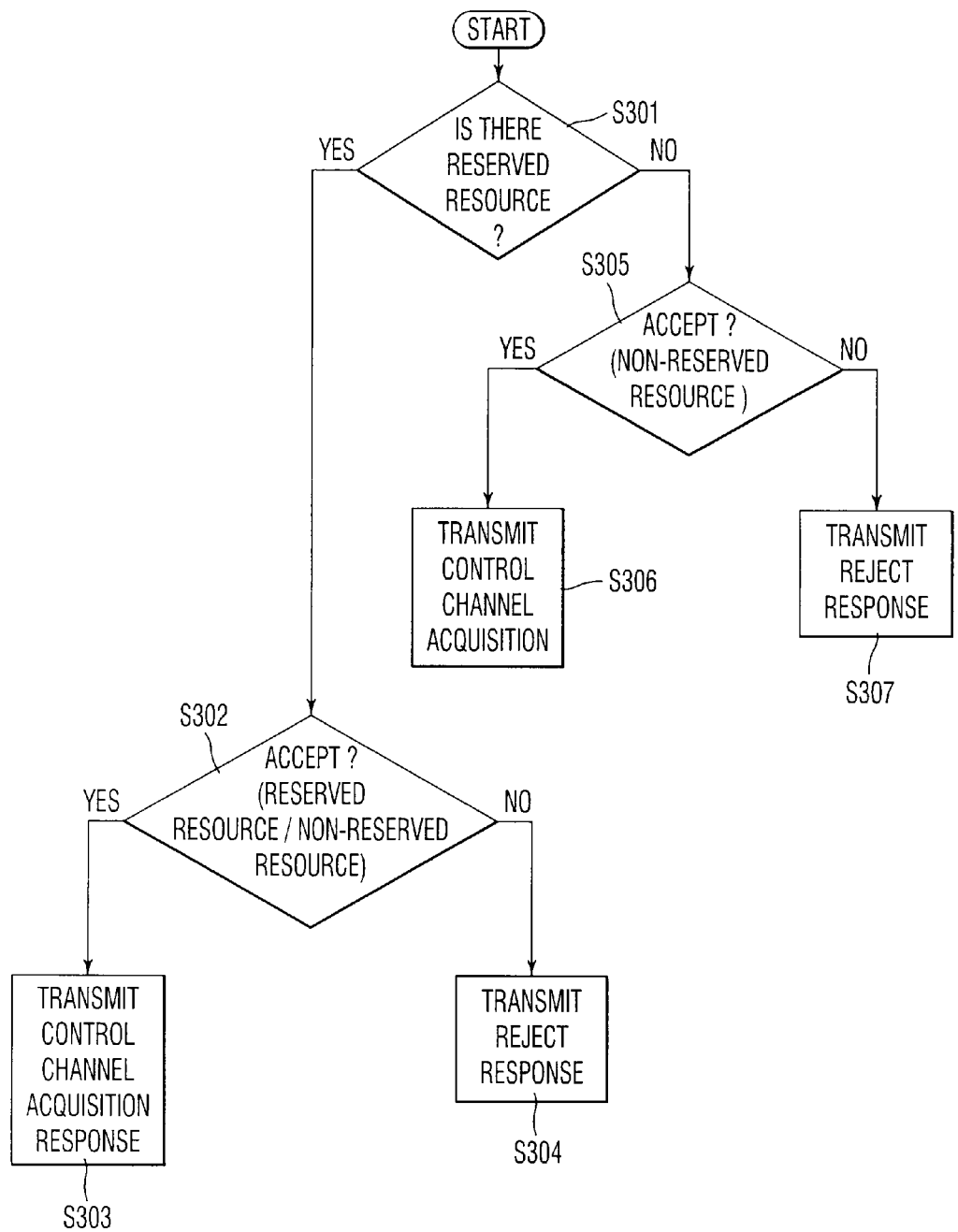
FIG. 10 is a flowchart showing operations of a network device according to Modified Example 2 of the present invention.

With reference to FIGS. 9 and 10, description is given below of a mobile communication system according to Modified Example 2 of the present invention by focusing on differences from the mobile communication system according to the first embodiment described above.

While the description has been given by taking the W-CDMA mobile communication system as an example in the first embodiment described above, Modified Example 2 is described by taking an LTE (Long Term Evolution) mobile communication system as an example.

Generally, in the LTE mobile communication system, a radio base station and an exchange MME (Mobility Management Entity) are configured to serve as the network device 100 described above. Here, in the mobile communication system according to this modified example, the functions of the network device 100 shown in FIG. 2 are installed in the femto-cell radio base station 201.

With reference to FIGS. 9 and 10, description is given of operations of the mobile communication system according to Modified Example 2.

As shown in FIG. 9, in Step S2001, the mobile station 300 transmits a control channel establishment request for connection-type communication to the femto-cell radio base station 201.

In Step S2002, the femto-cell radio base station 201 determines whether or not to accept the control channel establishment request for connection-type communication.

When determining to accept the control channel establishment request for connection-type communication, in Step S2003, the femto-cell radio base station 201 acquires a control channel resource for the mobile station 300, and transmits to the mobile station 300 a control channel instruction for instructing the control channel.

In Step S2004, a control channel is established between the femto-cell radio base station 201 and the mobile station 300.

In Step S2005, the mobile station 300 transmits a data channel establishment request for connection-type communication to the femto-cell radio base station 201 through the control channel established between the femto-cell radio base station 201 and the mobile station 300.

In Step S2006, the femto-cell radio base station 201 acquires a data channel resource for the mobile station 300, and transmits to the mobile station 300 a data channel instruction for instructing specific information on the data channel.

In Step S2007, a data channel is established between the femto-cell radio base station 201 and the mobile station 300.

Here, with reference to FIG. 10, description is given of the operation of the femto-cell radio base station 201 in Step S2002 for determining whether or not to accept the control channel establishment request for connection-type communication.

In Step S301, the femto-cell radio base station 201 determines whether or not a reserved resource is reserved for the mobile station 300 that is the source of the control channel establishment request received from the mobile station 300.

When determining in Step S301 that a reserved resource is reserved for the mobile station 300, the femto-cell radio base station 201 determines in Step S302 whether or not to accept the control channel establishment request based on whether or not there is any reserved resource for the mobile station 300 or any non-reserved resource available.

When determining in Step S302 to accept the control channel establishment request, the femto-cell radio base station 201 transmits the control channel acquisition response described above to the mobile station 300 in Step S303.

Meanwhile, when determining in Step S302 not to accept the control channel establishment request, the femto-cell radio base station 201 transmits to the mobile station 300 a reject response for notifying to that effect in Step S303.

When determining in Step S301 that a reserved resource is not reserved for the mobile station 300, the femto-cell radio base station 201 determines in Step S305 whether or not to accept the control channel establishment request based on whether or not there is any non-reserved resource available.

When determining in Step S305 to accept the control channel establishment request, the femto-cell radio base station 201 transmits the control channel acquisition request described above to the mobile station 300 in Step S306.

Meanwhile, when determining in Step S305 not to accept the control channel establishment request, the femto-cell radio base station 201 transmits to the mobile station 300 a reject response for notifying to that effect in Step S307.

Figure 14:
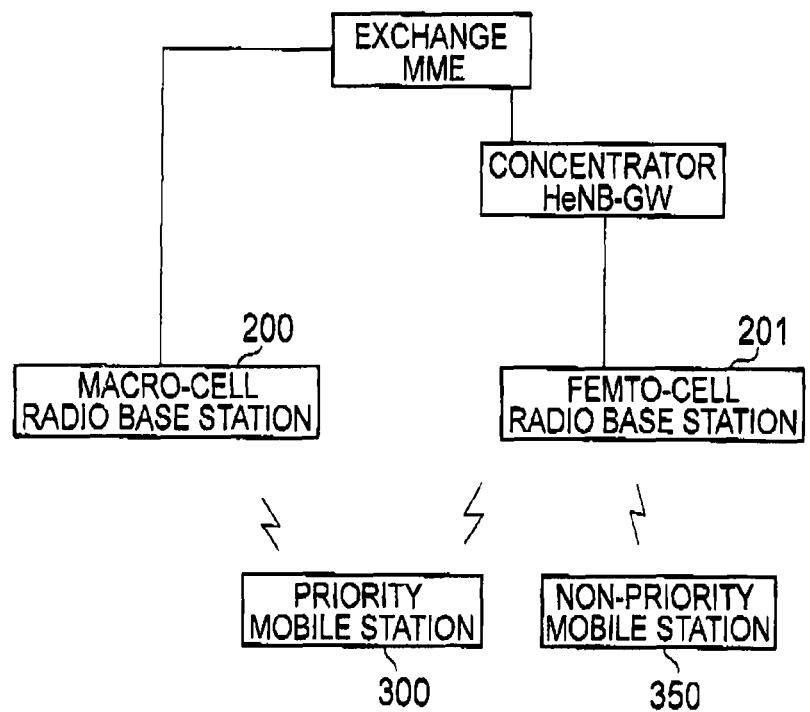
FIG. 14 is a diagram showing a specific configuration of the mobile communication system according to Modified Example 2 of the present invention.

Note that FIG. 14 shows an example of a specific configuration of a mobile communication system according to Modified Example 2. In the example shown in FIG. 14, an exchange MME and a concentrator HeNB-GW make up the network device 100 described above.

Here, the femto-cell radio base station 201 may be accommodated in the exchange MME instead of the concentrator HNE-GW.

In other words, a part of or the entire configuration of the network device 100 shown in FIG. 2 is provided in the exchange MME or the concentrator HeNB-GW.

Modified Example 3

In the mobile communication system according to the embodiment and modified examples described above, the network device 100 or the femto-cell radio base station 201 is configured to determine whether or not to accept the control channel establishment request. Meanwhile, in a mobile communication system according to Modified Example 3, a network device 100 or a femto-cell radio base station 201 is configured to determine whether or not to accept a data channel establishment request.

Note that, in the mobile communication system according to Modified Example 3, the network device 100 or the femto-cell radio base station 201 may be configured not to determine whether or not to accept the control channel establishment request.

The features of the embodiments described above may be expressed as follows.

A first aspect of this embodiment is summarized as a mobile communication method including: step A of establishing, upon receipt of a control channel establishment request for connection-type communication from a priority mobile station 300 in a femto-cell radio base station 201, a control channel for the priority mobile station 300 by using a first reserved resource A reserved for the priority mobile station 300 in the femto-cell radio base station 201; step B of establishing a data channel for the priority mobile station 300 in the femto-cell radio base station 201 by using the established control channel for the priority mobile station 300, in response to a data channel establishment request for connection-type communication transmitted from the priority mobile station 300 through the established control channel for the priority mobile station 300; step C of establishing, upon receipt of a control channel establishment request for connection-type communication from a non-priority mobile station 350 in the femto-cell radio base station 201, and in response to a data channel establishment request for connection-type communication transmitted from the non-priority mobile station 350 through the established control channel for the non-priority mobile station, a control channel for the non-priority mobile station 350 by using a non-reserved resource that is not reserved for any mobile station in the femto-cell radio base station; and step D of establishing a data channel for the non-priority mobile station 350 in the femto-cell radio base station by using the established control channel for the non-priority mobile station 350.

In the first aspect of this embodiment, in step B, the data channel for the priority mobile station 300 need not be established if there is no data channel resource available in the femto-cell radio base station 201, and in step D, the data channel for the non-priority mobile station 350 need not be established if there is no data channel resource available in the femto-cell radio base station 201.

In the first aspect of this embodiment, different reserved resources A to C may be reserved for different priority mobile stations 300 to 320 in the femto-cell radio base station 201.

A second aspect of this embodiment is summarized as a network device 100 including: a control channel establishment unit 14 configured to give an instruction, upon receipt of a control channel establishment request for connection-type communication from a priority mobile station 300 in a femto-cell radio base station 201, to establish a control channel for the priority mobile station 350 by using a first reserved resource A reserved for the priority mobile station 300 in the femto-cell radio base station 201, and to give an instruction, upon receipt of a control channel establishment request for connection-type communication from a non-priority mobile station 350 in the femto-cell radio base station 201, to establish a control channel for the non-priority mobile station 350 by using a non-reserved resource that is not reserved for any mobile station in the femto-cell radio base station 201; and a data channel establishment unit 16 configured to give an instruction to establish a data channel for the priority mobile station 300 in the femto-cell radio base station 201 by using the established control channel for the priority mobile station 300, in response to a data channel establishment request for connection-type communication transmitted from the priority mobile station 300 through the established control channel for the priority mobile station 300, and to give an instruction to establish a data channel for the non-priority mobile station 350 in the femto-cell radio base station 201, in response to a data channel establishment request for connection-type communication transmitted from the non-priority mobile station 350 through the established control channel for the non-priority mobile station 350.

In the second aspect of this embodiment, the data channel establishment unit 16 may be configured to give an instruction not to establish the data channel for the priority mobile station 300 or the data channel for the non-priority mobile station 350 if there is no data channel resource available in the femto-cell radio base station 201.

The second aspect of this embodiment may further include a resource management unit 12 configured to reserve different reserved resources A to C for different priority mobile stations 300 to 320 in the femto-cell radio base station 201.

A third aspect of this embodiment is summarized as a femto-cell radio base station 201 including: a control channel establishment unit 14 configured to establish, upon receipt of a control channel establishment request for connection-type communication from a priority mobile station 300, a control channel for the priority mobile station 300 by using a first reserved resource A reserved for the priority mobile station 300, and to establish, upon receipt of a control channel establishment request for connection-type communication from a non-priority mobile station 350, a control channel for the non-priority mobile station 350 by using a non-reserved resource that is not reserved for any mobile station; and a data channel establishment unit 16 configured to establish a data channel for the priority mobile station 300 in response to a data channel establishment request for connection-type communication transmitted from the priority mobile station 300 through the established control channel for the priority mobile station 300, and to establish a data channel for the non-priority mobile station 350 in response to a data channel establishment request for connection-type communication transmitted from the non-priority mobile station 350 through the established control channel for the non-priority mobile station 350.

In the third aspect of this embodiment, the data channel establishment unit 16 may be configured not to establish the data channel for the priority mobile station 300 or the data channel for the non-priority mobile station 350 if there is no data channel resource available.

The third aspect of this embodiment may further include a resource management unit 12 configured to reserve different reserved resources A to C for different priority mobile stations 300 to 320.

Note that operation of the above described femto-cell radio base station 201 and the network device 100 may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the femto-cell radio base station 201 or the network device 100. Also, the storage medium and the processor may be provided in femto-cell radio base station 201 or the network device 100 as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication method comprising:
    step A of establishing, upon receipt of a control channel establishment request for connection-type communication from a priority mobile station in a femto-cell radio base station, a control channel for the priority mobile station by using a first reserved resource reserved for the priority mobile station in the femto-cell radio base station;
    step B of establishing a data channel for the priority mobile station in the femto-cell radio base station in response to a data channel establishment request for connection-type communication transmitted from the priority mobile station through the established control channel for the priority mobile station;
    step C of establishing, upon receipt of a control channel establishment request for connection-type communication from a non-priority mobile station in the femto-cell radio base station, a control channel for the non-priority mobile station by using a non-reserved resource that is not reserved for any mobile station in the femto-cell radio base station; and step D of establishing a data channel for the non-priority mobile station in the femto-cell radio base station in response to a data channel establishment request for connection-type communication transmitted from the non-priority mobile station through the established control channel for the non-priority mobile station.

2. The mobile communication method according to claim 1, wherein in the step B, the data channel for the priority mobile station is not established if there is no data channel resource available in the femto-cell radio base station, and in the step D, the data channel for the non-priority mobile station is not established if there is no data channel resource available in the femto-cell radio base station.

3. The mobile communication method according to claim 1, wherein different reserved resources are reserved for different priority mobile stations in the femto-cell radio base station.

4. A network device comprising:

a control channel establishment unit configured to give an instruction, upon receipt of a control channel establishment request for connection-type communication from a priority mobile station in a femto-cell radio base station, to establish a control channel for the priority mobile station by using a first reserved resource reserved for the priority mobile station in the femto-cell radio base station, and to give an instruction, upon receipt of a control channel establishment request for connection-type communication from a non-priority mobile station in the femto-cell radio base station, to establish a control channel for the non-priority mobile station by using a non-reserved resource that is not reserved for any mobile station in the femto-cell radio base station; and a data channel establishment unit configured to give an instruction to establish a data channel for the priority mobile station in the femto-cell radio base station, in response to a data channel establishment request for connection-type communication transmitted from the priority mobile station through the established control channel for the priority mobile station, and to give an instruction to establish a data channel for the non-priority mobile station in the femto-cell radio base station, in response to a data channel establishment request for connection-type communication transmitted from the non-priority mobile station through the established control channel for the non-priority mobile station.

5. The network device according to claim 4, wherein the data channel establishment unit gives an instruction not to establish the data channel for the priority mobile station or the data channel for the non-priority mobile station if there is no data channel resource available in the femto-cell radio base station.

6. The network device according to claim 4, further comprising a resource management unit configured to reserve different reserved resources for different priority mobile stations in the femto-cell radio base station.

7. A radio base station comprising:

a control channel establishment unit configured to establish, upon receipt of a control channel establishment request for connection-type communication from a priority mobile station, a control channel for the priority mobile station by using a first reserved resource reserved for the priority mobile station, and to establish, upon receipt of a control channel establishment request for connection-type communication from a non-priority mobile station, a control channel for the non-priority mobile station by using a non-reserved resource that is not reserved for any mobile station; and a data channel establishment unit configured to establish a data channel for the priority mobile station in response to a data channel establishment request for connection-type communication transmitted from the priority mobile station through the established control channel for the priority mobile station, and to establish a data channel for the non-priority mobile station in response to a data channel establishment request for connection-type communication transmitted from the non-priority mobile station through the established control channel for the non-priority mobile station.

8. The radio base station according to claim 7, wherein the data channel establishment unit is configured not to establish the data channel for the priority mobile station or the data channel for the non-priority mobile station if there is no data channel resource available.

9. The radio base station according to claim 7, further comprising a resource management unit configured to reserve different reserved resources for different priority mobile stations.

* * * * *